United States Patent
Neal et al.

(10) Patent No.: US 6,503,619 B1
(45) Date of Patent: Jan. 7, 2003

(54) SOFT TOUCH LABELS

(75) Inventors: Philip John Neal, Overijse (BE); Ernst Van Issum, Grez-Doiceau (BE)

(73) Assignee: Advanced Elastomer Systems, L.P., Akron, OH (US)

(*) Notice: Subject to any disclaimer, the term of this patent is extended or adjusted under 35 U.S.C. 154(b) by 0 days.

(21) Appl. No.: 09/744,538

(22) PCT Filed: Jun. 8, 1999

(86) PCT No.: PCT/EP99/05694

§ 371 (c)(1), (2), (4) Date: Mar. 22, 2001

(87) PCT Pub. No.: WO00/08622

PCT Pub. Date: Feb. 17, 2000

Related U.S. Application Data

(60) Provisional application No. 60/095,641, filed on Aug. 7, 1998.

(51) Int. Cl.⁷ .......................... G09J 7/02; B32B 15/04
(52) U.S. Cl. .................. 428/343; 428/354; 428/355 R; 428/480; 428/483
(58) Field of Search .................. 428/343, 354, 428/355 R, 480, 483

(56) References Cited

U.S. PATENT DOCUMENTS 5,151,309 A * 9/1992 Dollinger .................... 428/40
5,585,193 A * 12/1996 Josephy et al. ............. 428/515

FOREIGN PATENT DOCUMENTS

EP 0 667 234 A1 * 8/1995

OTHER PUBLICATIONS

Derwent abstract of JP 07224257 A.*

* cited by examiner

Primary Examiner—Daniel Zirker
Assistant Examiner—Victor S Chang
(74) Attorney, Agent, or Firm—William A. Skinner

(57) ABSTRACT

The invention relates to soft touch printed labels comprising a coextruded sheet of a thermoplastic elastomer and a polyolefin.

15 Claims, 3 Drawing Sheets

SOFT TOUCH LABELS

This application claims the benefit of provisional application Ser. No. 60/095,641, filed Aug. 7, 1998.

FIELD OF THE INVENTION

The present invention relates to a soft touch label comprising a coextruded film of a thermoplastic elastomer (TPE) and a polyolefin layer.

BACKGROUND OF THE INVENTION

Current materials used for self-adhesive or heat-shrink film labels, for example polyethylene, polypropylene, polyethylene terephthalate and the like, have a plastic hard feel or touch. The packaging industry has shown an interest in the concept of "soft touch" films for use as self-adhesive or heat-shrink labels. While many thermoplastic elastomer materials have an inherent soft feel, films of these materials are difficult to form and process through printing and laminating equipment for the preparation of labels. Due to the high elongation characteristics of thermoplastic elastomers of more than 100%, printing on such films may result in print distortion and colors out of synchronization. Films of thermoplastic elastomers which are dimensionally stable under label making conditions would be desirable.

BRIEF SUMMARY OF THE INVENTION

The present invention relates to film of thermoplastic elastomers which are dimensionally stable when used for manufacturing of pressure sensitive labels. It has now been found that dimensional stabilization of the films is achieved by coextrusion of the thermoplastic elastomer with a polyolefin material thus rendering said films suitable for label applications.

In particular the present invention relates to a label (1) comprising an adhesive layer (2) and a coextruded film (3) of (a) an uppermost thermoplastic elastomer layer (4), selected from the group consisting of
blends of a thermoplastic polyolefin with a curable rubber selected from ethylene-propylene copolymer rubber, ethylene-propylene-diene rubber, butyl rubber, natural rubber, nitrile rubber, polyisoprene rubber, polychloroprene rubber, copolymer of $C_{4-7}$ isomonoolefin and para-$C_{1-8}$-alkyl styrene or its halogenated derivatives, polybutadiene rubber, styrene-butadiene rubber, or
styrene/conjugated diene/styrene block copolymer; and (b) a polyolefin or polyester layer (5).

Preferred embodiments of the invention are as follows:

the coextruded film is printed on the outer surface of the polyolefin/polyester layer, on the outer surface of the thermoplastic elastomer layer, or both;

the coextruded film is laminated on its polyolefin/polyester side to an additional polyolefin sheet/base label, which may be printed;

lamination between the coextruded film and the polyolefin base label is effected by a layer of a laminating adhesive;

the additional polyolefin sheet is selected from polyethylene or a polypropylene sheet;

the adhesive layer is formed by a pressure sensitive adhesive;

the polyolefin of the coextruded sheet is selected from polyethylene or polypropylene;

the polyester of the coextruded sheet is an amorphous polyethylene terephthalate;

the label is applied to a substrate with paper being preferred;

the coextruded film is a heat-shrinkable uniaxially or biaxially heat-stretched film;

the coextruded film has a thickness of 40 $\mu$m to 120 $\mu$m;

the ratio thermoplastic elastomer layer to polyolefin layer of the coextruded sheet is from 1:9 to 1:1;

in the thermoplastic elastomer the rubber has been partially, fully or not cured.

By the term "pressure-sensitive" labels it is meant that no heat needs to be applied for effectively adhering the label with its adhesive side to an article.

By the term "soft", "soft-touch" or "soft thermoplastic elastomer" there is meant the property of the uppermost layer of the coextruded sheet which originates from the thermoplastic elastomer having a Shore A hardness (ASTM D 2240) of from at least 35, preferably at least 40 to up to 80, preferably up to 70 and more preferably up to 60.

BRIEF DESCRIPTION OF THE DRAWINGS

The drawings schematically represent various embodiments of the present invention.

Figure 1:
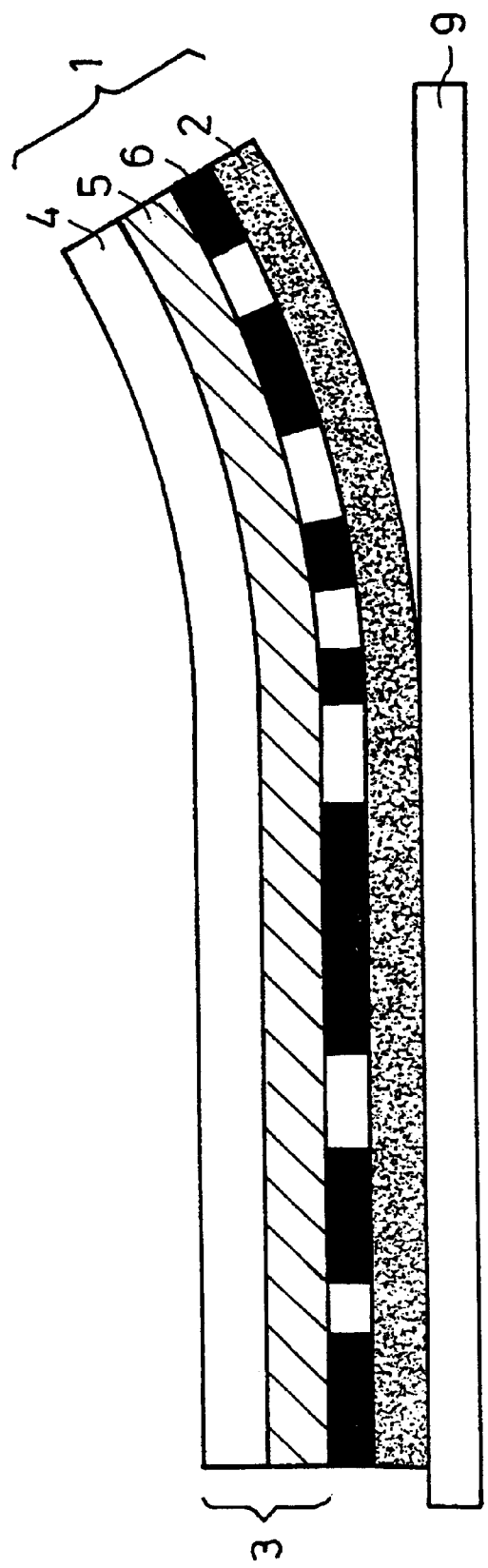
FIG. 1 shows a label (1) of comprising an adhesive layer (2) and a coextruded film (3) of a polyolefin layer (5) and a thermoplastic elastomer layer (4). The thermoplastic elastomer layer (4) forms the uppermost layer and a print layer (6) is applied to the outer surface of the polyolefin layer (5). A pressure sensitive adhesive layer (2) is present between the print (6) and layer (6) and a backing paper as the label substrate layer (9).
Figure 2:
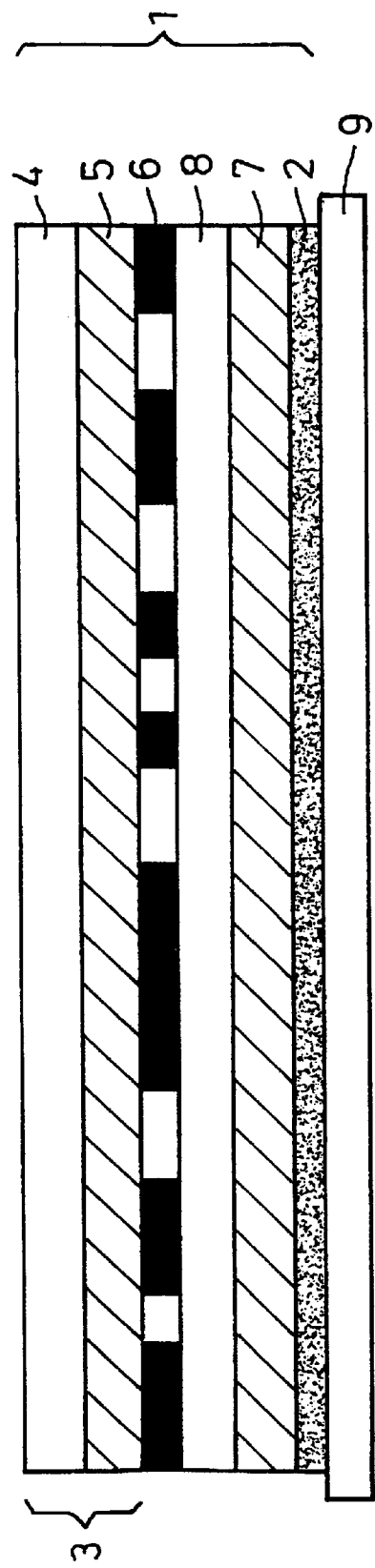
FIG. 2 represents an embodiment in which the coextruded sheet (3) is printed (6) on the outer surface of the polyolefin layer (5) and is adhesively applied to a polyolefin film (7) (also called base label) by means of a laminating adhesive layer (8).
Figure 3:
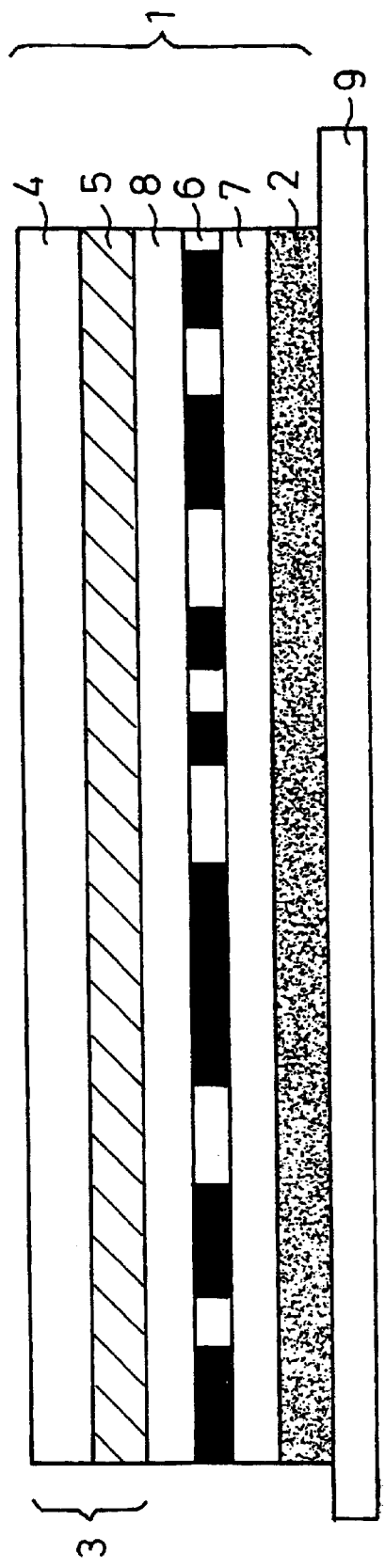
FIG. 3 shows an embodiment in which the coextruded film (3) is laminated to a printed polyolefin sheet (7) by means of a laminating adhesive layer (8).

Instead of the polyolefin layer (5) a layer of a polyester can be employed in teh label according to the invention.

DETAILED DESCRIPTION OF THE INVENTION

Coextruded film (3)

1. Thermoplastic Elastomer Layer (4)

The term "thermoplastic elastomer" (TPE) in general defines blends of polyolefins and rubbers in which blends the rubber phase is not cured, i.e., so-called thermoplastic olefins (TPO), blends of polyolefins and rubbers in which blends the rubber phase has been partially or fully cured by a vulcanization process to form thermoplastic vulcanizates (TPV), or unvulcanized styrene/conjugated diene/styrene block-copolymers or blends thereof.

The thermoplastic elastomers according to the present invention are selected from blends of rubbers and polyolefins in which the rubber has been partially or fully cured or in which the rubber is not cured, styrene/conjugated diene/styrene block-copolymers or their hydrogenated derivatives and blends thereof.

1.1 Polyolefin/Rubber Blends

Polyolefin

The polyolefins include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, and the like, mixtures thereof and copolymers thereof with (meth)acrylates and/or vinyl acetates, and the like. Preferred, however, are monomers having about 3 to about 6 carbon atoms, with propylene being most preferred. As used in the specification and claims the term polypropylene includes homopolymers of propylene as well as reactor and/or random copolymers of polypropylene which can contain about 1 to about 20 wt.% of ethylene and/or an α-olefin comonomer of about 4 to about 16 carbon atoms, and mixtures thereof. The polypropylene can be highly crystalline isotactic or syndiotactic polypropylene. Commercially available polyolefins may be used in the practice of this invention. Further polyolefins which can be used in terms of the invention are high, low, linear-low, very low-density polyethylenes and copolymers of ethylene with (meth)acrylates and/or vinyl acetates, and the like.

The polyolefins mentioned above can be made by conventional Ziegler/Natta catalyst systems or by metallocene-based (single-site) catalyst-systems.

Rubber Component

The curable rubber suitable for use in the manufacture of the thermoplastic elastomer may be monoolefinic copolymer rubber (elastomers) comprise non-polar, rubbery copolymers of two or more α-monoolefins, preferably copolymerized with at least one polymer, usually a diene. Saturated monoolefin copolymer rubber, for example ethylene-propylene copolymer rubber (EPM) can be used.

However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbomene (ENB); 1,4-hexadiene; 5-methylene-2-norbomene (MNB); 5-vinyl norbornene (VNB); 1,6-octadiene; 5-methyl-1,4-hexadiene; 3,7-dimethyl-1,6-octadiene; 1,3-cyclopentadiene; 1,4-cyclohexadiene and dicyclopentadiene (DCPD), and the like.

Butyl rubbers are also useful in the compositions of the invention. As used in the specification and claims, the term "butyl rubber" includes copolymers of an isoolefin and a conjugated monoolefin, terpolymers of an isoolefin and a conjugated monoolefin, terpolymers of an isoolefin with or without a conjugated monoolefin, divinyl aromatic monomers and the halogenated derivatives (halogenated butyl rubber) of such copolymers and terpolymers.

The useful butyl rubber copolymers comprise a major portion of isoolefin and a minor amount, usually less than about 30 wt.% of a conjugated multiolefin. The preferred copolymers comprise about 85–99.5 wt.% of a $C_{4-7}$ isoolefin such as isobutylene and 15–0.5 wt.% of a multiolefin of 4 to 14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co-and terpolymer rubbers are illustrated by the description in U.S. Pat. No. 5,916,180 which is incorporated herein by reference.

Another suitable copolymer within the scope of the olefinic rubber of the present invention is a copolymer of a $C_{4-7}$ isomonoolefin and a para-$C_{1-8}$-alkylstyrene, and preferably a halogenated derivative thereof. The amount of halogen in the copolymer, predominantly in the para-alkylstyrene, is from about 0.1 to about 10 wt.%. A preferred example is the brominated copolymer of isobutylene and para-methylstyrene. These copolymers are more fully described in U.S. Pat. No. 5,162,445 which is incorporated herein by reference.

A further olefinic rubber suitable in the invention is natural rubber. The main constituent of natural rubber is the linear polymer cis-1,4-polyisoprene. It is normally commercially available in the for of smoked sheets and crepe. Synthetic polyisoprene can also be used. Furthermore, polybutadiene rubber and styrene-butadiene-copolymer rubbers can also be used.

Blends of any of the above olefinic rubbers can be employed, rather than a single olefinic rubber.

Further suitable rubbers are nitrite rubbers. Examples of the nitrite group-containing rubber include a copolymer rubber comprising an ethylenically unsaturated nitrite compound and a conjugated diene. Further, the copolymer rubber may be one in which the conjugated diene units of the copolymer rubber are hydrogenated. Specific examples of the ethylenically unsaturated nitrite compound includes acrylonitrile, α-chloroacrylonitrile, α-fluoroacrylonitrile, methacrylonitrile, and the like. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferred. Especially preferred nitrite rubbers comprise copolymers of 1,3-butadiene and about 10 to abut 50 percent of acrylonitrile.

Another suitable rubber in terms of the present invention are based on polychlorinated butadienes such as polychloroprene rubbers. These rubbers are commercially available under the trade names Neoprene® and Bayprene®.

In the blend of the polyolefin and the rubber, the rubber is contained in an amount of 20 to 60 wt.-%, more preferably in an amount of 40 to 50 wt.-%, based on the polyolefin/rubber blend.

The elastomer (rubber) component of the rubber/polyolefin blend may be used uncured to form TPOs or it can be partially or fully vulcanized (crosslinked) to form TPVs. Those of ordinary skill in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the optimum crosslinking desired. Any known cure system can be used, so long as it is suitable under the vulcanization conditions for the elastomer or combination of elastomers being used and is compatible with the thermoplastic polyolefin component of the TPV. These curatives include sulfur, sulfur donors, metal oxides, phenolic resin systems, maleimides, peroxide-based systems, high energy radiation and the like, both with and without accelerators and co-agents. Another curing systems which can be used is the hydrosilylation system which consists of the use of a silicon hydride curative catalyzed with a platinum or rhodium derivative. Such systems are disclosed, for instance, in EP-A-0 776 937. Phenolic resin curatives are preferred for the preparation of the TPV composition of the invention, and such cure systems are well known in the art and literature of vulcanization of elastomers. Their use in TPV compositions is more fully described in U.S. Pat. No. 4,311,628, the disclosure of which is fully incorporated herein by this reference. Usually about 5 to about 20 weight parts of the curative or curative system are used per 100 weight parts of the rubber to be cured.

The process of dynamically curing the rubber in a polyolefin matrix is well known in the art. Early work found in U.S. Pat. No. 3,037,954 discloses the technique of dynamic vulcanization wherein a vulcanizable elastomer is dispersed into a resinous thermoplastic polymer and the elastomer is cured in the presence of a curative while continuously mixing and shearing the polymer blend. The resulting composition [dynamically vulcanized alloy, or thermoplastic vulcanizate (TPV)] is a microgel dispersion of cured elastomer in an uncured matrix of thermoplastic polymer. Since then the technology has advanced significantly. For further general background information it is referred to EP-A-0 473 703, EP-A-0 657 504, WO-A-95/26380 and other patent applications of the applicant.

Most preferred TPVs are selected from partially or fully cured EPDM-rubber/polypropylene TPVS. Most preferred TPOs are selected from blends of EPDM-rubber and polypropylene.

1.2 Styrene/Conjugated Diene/Styrene Block-Copolymers

Another thermoplastic elastomer is a block-copolymer of styrene/conjugated diene/styrene, with the conjugated diene optionally being fully or partially hydrogenated, or mixtures thereof. Generally this block-copolymer may contain about 10 to about 50 weight-%, more preferably about 25 to about 35 weight-% of styrene and about 90 to about 50 weight-%, more preferably about 75 to about 35 weight-% of the conjugated diene, based on said block-copolymer. Most preferably, however, is a block-copolymer which contains about 30 weight-% of styrene and about 70 weight-% of the conjugated diene. The conjugated diene is selected from butadiene, isoprene or mixtures thereof. Specific block-copolymers of the styrene/conjugated diene/styrene-type are SBS, SIS, SIBS, SEBS and SEPS block copolymers. These block-copolymers are known in the art and are commercially available.

Exemplary styrene/conjugated diene/styrene block-copolymers are styrene-butadiene-isoprene-styrene block-copolymer or its hydrogenated derivative, styrene-ethylene-butene-styrene block-copolymer and blends thereof.

2. Layer (5)

Suitable polyolefin layers (5) are selected from conventional polyethylenes and polypropylenes, the polyester layer (5) is an amorphous polyethylene terephthalate known to the person skilled in this art of coextruding films by the cast or blow method.

The coextruded film (3) comprising the TPE layer (4) and the polyolefin/polyester layer (5) has a thickness of 40 μm to 120 μm, more preferably 60 μm to 100 μm, most preferably 60 μm to 80 μm.

The ratio of the thickness of the TPE layer (4) to the polyolefin/polyester-layer (5) is from 1:9 to 1:1, more preferably from 2:8. to 1:1.

In another embodiment the coextruded film (3) can be uniaxially or biaxially heat stretched thus rendering it heat-shrinkable. Heat-shrinkage can be effected by state of the art methods prior to printing the film (3).

Polyolefin Layer/Base label (7)

Suitable polyolefin layers (7) are selected from polyethylenes and polypropylenes such those defined above in context with the polyolefin/polyester layer (5). The polyolefin base label (7), if present, has a thickness of 20 μm to 60 μm, preferably between 30 μm to 50 μm. In a preferred embodiment of this invention the polyolefin base label (7) is printed.

The label (1) as such has a total thickness (including the optional base label (7) and the laminating adhesive layer and the pressure sensitive adhesive layer) of 45 μm to 200 μm, preferably 60 μm to 175 μm.

The layers (4), (5) and (6) may optionally and independently contain additives known in the art such as reinforcing or non-reinforcing fillers, antioxidants, heat-stabilizers, antistatic agents, pigments, flame-retardants, UV-stabilizers, and process-aids. The total amount of said additives is between about 0.05 and 15% by weight, based on the layer composition, depending on the nature of the additives themselves.

The printing of the outer surface of the TPE layer(4) or polyolefin/polyester layer (5) of the coextruded sheet (3) as well as the polyolefin base layer sheet (7) is conventional in the art. Printing processes such as rotary letterpress printing, rotary screen printing, gravure printing, flexographic printing, offset printing, laser printing, or ink-jet printing can be employed.

The surface of the respective layer may have to be pretreated to facilitate printing, for instance by corona-, flame-, plasma treatment or applying coatings. These techniques, however, are known and conventional in the art.

Either side or both sides of the coextruded sheet (3) can be printed. Preferably the polyolefin/polyester sheet (5) is printed which has the advantage that the print is not abraded and that the soft touch of the uppermost TPE-layer is not impaired by the printing layer. If the coextruded sheet (3) is laminated to a polyolefin base label (7) the polyolefin sheet (7) can be printed prior to lamination, preferably on the side with which it is laminated to the polyolefin/polyester layer (5) of the coextruded sheet (3).

Of course, the structure is sufficiently translucent to permit the printing (6) to be clearly visible in the label, in particular in cases in which the label is printed on the polyolefin/polyester layer (5) and/or the base label (7).

Laminating adhesives (8) for laminating polymeric layers together are known in the art. Reference is made to Gerd Habenicht in "Kleben", Springer-Verlag, $2^{nd}$ Edition (1990), Chapter 3.8 and Ulimann's Encyclopedia of Industrial Chemistry, VCH Veriagsgesellschaft mbH, $5^{th}$ Edition, 1985, Vol. A1, pages 221 et seq., the disclosure of which is incorporated herein by reference.

Adhesives (2) are applied to the polyolefin layer (5) or (7) for adhering the label (1) to the substrate (9) and later on to the final article. As is known in the art of label manufacturing the adhesive stays on the label when the label is separated from the label substrate to be applied to the article. Suitable adhesives are selected from those known in the art such as hot-melt adhesiveness, water-based (dispersion) adhesives, solvent-based adhesives which may be sprayable. For further details it is referred to G. Habenicht, in "Kleben", Springer-Verlag, $2^{nd}$ Edition, (1990), Chapter 12.3.3 the disclosure of which is incorporated herein by reference.

Any known label substrate can be used for making the labels according to the present invention. For instance paper which has been treated on its surface with an anti-adhesive component (for example silicone), known as release paper, or non-polar polymeric film substrates such as polyethylene or polypropylene films.

The labels according to the present invention have a soft feel or touch and at the same time provide an antislip property to the article to which they are adhered in both under wet and dry conditions. Thus, the labels according to the present invention are particularly useful in the field of decoration of packaging, antislip mats and other purposes in which a soft and antislip property is desired.

The invention is further explained by the following Example.

EXAMPLE

Materials used:

Santoprene® 8210-70: a blend of polypropylene with fully crosslinked EPDM with a Shore A hardness of 70 (ASTM D2240), commercially available from Advanced Elastomer Systems, Akron, US.

Borealis® HA 125J: polypropylene commercially available from Borealis

A film of polypropylene and thermoplastic elastomer was prepared on a Collin coextrusion cast line. Santoprene® 8210-70 thermoplastic elastomer and Borealis HA125J polypropylene were coextruded in a 50/50 ratio to form a total film thickness of 120 $\mu$m. The thermoplastic elastomer was extruded on the chill roll side.

The thermoplastic elastomer side of the film had a smooth soft feel, and the film was dimensionally stable, suitable for printing and forming into a label. After corona-treatment of the polyolefin surface the film was then printed on said surface by rotation screen printing. Thereafter a modified acrylate adhesive was applied to the printed surface which was then applied to a siliconized paper. The structure obtained is shown in FIG. 1.

Summary of Reference Signs Used in the Description and Figures (1) label
(2) adhesive layer
(3) coextruded film
(4) thermoplastic elastomer layer
(5) polyolefin layer or, alternatively, polyester layer
(6) print layer
(7) optionally printed polyolefin sheet/base label
(8) adhesive layer for laminating sheet (5) to sheet (7)
(9) substrate layer

What is claimed is:

1. A label (1) comprising an adhesive layer (2) and a coextruded film (3) of
   (a) an uppermost thermoplastic layer (4), comprising blends of a thermoplastic polyolefin with an at least partially cured rubber selected from the group consisting of ethylene-propylene copolymer rubber, ethylene-propylene-diene rubber, butyl rubber, natural rubber, nitrile rubber, polyisoprene rubber, polychloroprene rubber, copolymer of $C_{4-7}$ isomonoolefin and para-$C_{1-8}$-alkyl styrene or its halogenated derivatives, polybutadiene rubber, styrene-butadiene rubber, and
   (b) a polyolefin or polyester layer (5).

2. The label (1) according to claim 1, wherein the coextruded film (3) is printed (6) on the outer surface of the polyolefin/polyester layer (5), on the outer surface of the thermoplastic elastomer layer (4), or both.

3. The label (1) according to claim 1, wherein the coextruded film (3) is laminated on its polyolefin side to a polyolefin sheet (7).

4. The label (1) according to claim 3, wherein the polyolefin sheet (7) is printed.

5. The label (1) according to claim 3, wherein lamination is effected by a layer of a laminating adhesive (8).

6. The label (1) according to claim 1, wherein the polyolefin (5) of the coextruded sheet (3) is selected from polyethylene or polypropylene.

7. The label (1) according to claim 1, wherein the polyester (5) of the coextruded sheet (3) is selected from amorphous polyethylene terephthalate.

8. The label (1) according to claim 3, wherein the polyolefin sheet (7) is selected from polyethylene or a polypropylene sheet.

9. The label (1) according to claim 1, wherein the adhesive layer (2) is a pressure sensitive adhesive.

10. The label (1) according to claim 1 on a substrate (9).

11. The label (1) according to claim 10, wherein the substrate (9) is selected from the group consisting of release paper, polyethylene or polypropylene.

12. The label (1) according to claim 1, wherein the coextruded film (3) is a heat-shrinkable uniaxially or biaxially heat-stretched film.

13. The label (1) according to claim 1, wherein the coextruded film (3) has a thickness of 40 $\mu$m to 120 $\mu$m.

14. The label (1) according to claim 1, wherein the ratio of thermoplastic elastomer layer (4) to polyolefin/polyester layer (5) is from 1:9 to 1:1.

15. The label (1) according to claim 1, wherein the rubber is fully cured.

* * * * *